United States Patent
Douglass et al.

(10) Patent No.: US 10,391,695 B2
(45) Date of Patent: Aug. 27, 2019

(54) RETRACTING EXTRUDER BARREL WITH COOLING FEATURES

(71) Applicants: Brian L. Douglass, Willman, MN (US); Carl R. Douglass, III, Willmar, MN (US)

(72) Inventors: Brian L. Douglass, Willman, MN (US); Carl R. Douglass, III, Willmar, MN (US)

(*) Notice: Subject to any disclaimer, the term of this patent is extended or adjusted under 35 U.S.C. 154(b) by 421 days.

(21) Appl. No.: 14/684,858

(22) Filed: Apr. 13, 2015

(65) Prior Publication Data

US 2015/0290861 A1    Oct. 15, 2015

Related U.S. Application Data

(60) Provisional application No. 61/978,400, filed on Apr. 11, 2014.

(51) Int. Cl.
| | |
|---|---|
| *B29C 48/68* | (2019.01) |
| *B33Y 30/00* | (2015.01) |
| *B29C 48/80* | (2019.01) |
| *B29C 64/106* | (2017.01) |
| *B29C 64/112* | (2017.01) |
| *B29C 48/92* | (2019.01) |
| *B33Y 10/00* | (2015.01) |
| *B29C 48/02* | (2019.01) |
| *B29C 48/05* | (2019.01) |
| *B29C 48/25* | (2019.01) |

(52) U.S. Cl.
CPC ............ *B29C 48/68* (2019.02); *B29C 48/832* (2019.02); *B29C 48/834* (2019.02); *B29C 48/92* (2019.02); *B29C 64/106* (2017.08); *B29C 64/112* (2017.08); *B33Y 30/00* (2014.12); *B29C 48/02* (2019.02); *B29C 48/05* (2019.02); *B29C 48/2528* (2019.02); *B29C 48/266* (2019.02); *B29C 2948/92571* (2019.02); *B33Y 10/00* (2014.12)

(58) Field of Classification Search
CPC ....... B29C 47/66; B29C 47/822; B33Y 30/00; B33Y 10/00
See application file for complete search history.

(56) References Cited

U.S. PATENT DOCUMENTS

| | | | |
|---|---|---|---|
| 5,121,329 A * | 6/1992 | Crump | ............ B22F 3/115 228/180.5 |
| 5,816,466 A | 10/1998 | Seufer | |
| 6,041,991 A | 3/2000 | Mehri | |
| 6,085,957 A | 7/2000 | Zinniel | |
| 6,129,872 A | 10/2000 | Jang | |
| 6,685,866 B2 | 2/2004 | Swanson | |
| 7,604,470 B2 | 10/2009 | LaBossiere et al. | |

(Continued)

*Primary Examiner* — Jacob T Minskey
*Assistant Examiner* — Melody Tsui
(74) *Attorney, Agent, or Firm* — Tarolli, Sundheim, Covell & Tummino LLP; John A. Yirga, Esq.

(57) ABSTRACT

A barrel for use in an additive manufacturing machine is disclosed. The barrel includes a sleeve extending along a longitudinal axis. A conduit extends along the longitudinal axis through the sleeve. The conduit is movable relative to the sleeve along the longitudinal axis between a first position and a second position. A nozzle is associated with the conduit. The nozzle is movable with the conduit relative to the sleeve between the first position and the second position.

20 Claims, 6 Drawing Sheets

(56) References Cited

U.S. PATENT DOCUMENTS

| | | |
|---|---|---|
| 8,647,102 B2 | 2/2014 | Swanson |
| 8,827,684 B1 | 9/2014 | Schumacher |
| 9,050,753 B2 | 6/2015 | Rodgers |
| 9,469,071 B2 | 10/2016 | Douglass et al. |
| 2007/0228590 A1 | 10/2007 | LaBossiere |
| 2009/0035405 A1 | 2/2009 | Leavitt |
| 2009/0295032 A1 | 12/2009 | Hopkins |
| 2012/0189729 A1 | 7/2012 | Pax |
| 2013/0164960 A1 | 6/2013 | Swanson |
| 2014/0159273 A1 | 6/2014 | Koop |
| 2014/0192117 A1* | 7/2014 | Obertegger ............... B41J 2/04 347/54 |
| 2014/0263534 A1 | 9/2014 | Post |
| 2015/0035198 A1* | 2/2015 | Saba ..................... B33Y 10/00 264/211.12 |
| 2015/0037446 A1 | 2/2015 | Douglass |
| 2015/0084222 A1 | 3/2015 | Heston |
| 2015/0110918 A1* | 4/2015 | Dezon-Gaillard ...... B29C 45/27 425/564 |
| 2016/0263827 A1* | 9/2016 | Fripp ................. B29C 67/0055 |

\* cited by examiner

RETRACTING EXTRUDER BARREL WITH COOLING FEATURES

CROSS REFERENCES TO RELATED APPLICATIONS

The following application claims priority under 35, U.S.C. § 119(e) to U.S. Provisional Patent Application Ser. No. 61/978,400 filed Apr. 11, 2014 entitled RETRACTING EXTRUDER BARREL WITH COOLING FEATURES. The above-identified application is incorporated herein by reference in its entirety for all purposes.

TECHNICAL FIELD

The present disclosure generally relates to additive manufacturing, and more particularly to an extruder barrel assembly that extends and retracts along a longitudinal axis of the extruder barrel assembly.

BACKGROUND

Additive manufacturing, also known as 3-D printing and rapid prototyping, is the process of extruding plastic material through a nozzle to form three dimensional models. The models formed by additive manufacturing may be used for functional prototype testing, reviewing fit and function of physical parts, and/or in low volume production scenarios. Additive manufacturing allows for the quick manufacture of physical parts while also reducing cost by eliminating the need for expensive tooling and/or processes that would otherwise be needed to manufacture the parts.

Another benefit of additive manufacturing is the ability to extrude a variety of different plastic materials. The ability to extrude many different plastic materials allows for the selection of plastic based on the physical and/or mechanical properties of the plastic material. Yet another benefit of additive manufacturing is the ability to extrude the plastic material through a variety of different nozzles. The ability to use different nozzles allows physical models to he created at a slower rate with greater detail using a smaller nozzle, or the physical models can be created at a faster rate with less detail using a larger nozzle.

Traditionally, additive manufacturing machines have been equipped with a single nozzle. More recent additive manufacturing machines are being provided with two or more nozzles. The additional nozzles provided the benefit of being able to continuously manufacture a physical part utilizing different plastic materials and/or nozzles without having to interrupt operation of the machine to change out the plastic material and/or nozzle.

The existence of more than one nozzle presents a problem in that each of the nozzles must be elevated the exact same distance over the platform on which the physical part is manufactured in order to ensure accurate manufacture of the physical part. However, elevating all of the nozzles at the same distance creates the risk of one or more of the nozzles coming into contact with the physical part, thereby damaging the part being manufactured.

Current solutions for the above noted difficulty are problematic in that the current solutions undesirably add cost and complexity to the additive manufacturing machine.

SUMMARY

One aspect of the present disclosure comprises a barrel for use in an additive manufacturing machine. The barrel includes a sleeve extending along a longitudinal axis and a conduit extending along the longitudinal axis through the sleeve. The conduit is movable relative to the sleeve along the longitudinal axis between a first position and a second position. A nozzle is associated with the conduit, The nozzle is moveable with the conduit relative to the sleeve between the first position and the second position.

Another aspect of the present disclosure comprises another barrel for use in an additive manufacturing machine. The barrel includes a sleeve extending along a longitudinal axis and a conduit extending along the longitudinal axis through the sleeve. An actuating system is associated with the sleeve. The actuating system is configured to move the conduit along the longitudinal axis relative to the sleeve between a first position and a second position. A nozzle is associated with the conduit. The nozzle is moveable with the conduit relative to the sleeve between the first position and the second position.

Yet another aspect of the present disclosure comprises a method of manufacturing a three dimensional model. The method includes the step of providing an additive manufacturing machine having at least two barrels. Each of the at least two barrels is moveable between a first position and a second position. The first barrel of the at least two barrels is provided with a first material and the second barrel of the at least two barrels is provided with a second material. The first barrel of the at least two barrels is moved from the first position to the second position and the first material is advanced. The first barrel of the at least two barrels is moved from the second position to the first position and the first material is retracted. The second barrel of the at least two barrels is moved from the first position to the second position and the second material is advanced. The second barrel of the at least two barrels is moved from the second position to the first position and the second material is retracted.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Referring now to the figures wherein like numbered features shown therein refer to like elements throughout unless otherwise noted.

Figure 1:
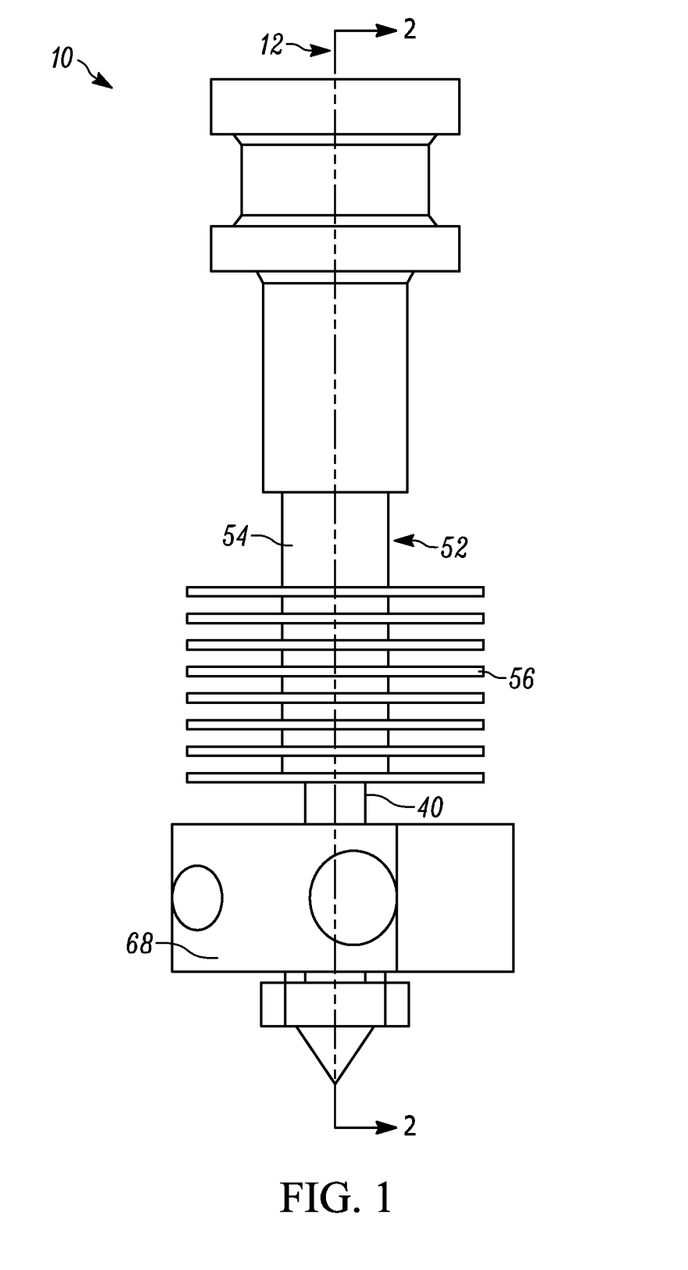
FIG. 1 is a side view of an extruder barrel assembly in a stand-by state.
Figure 2:
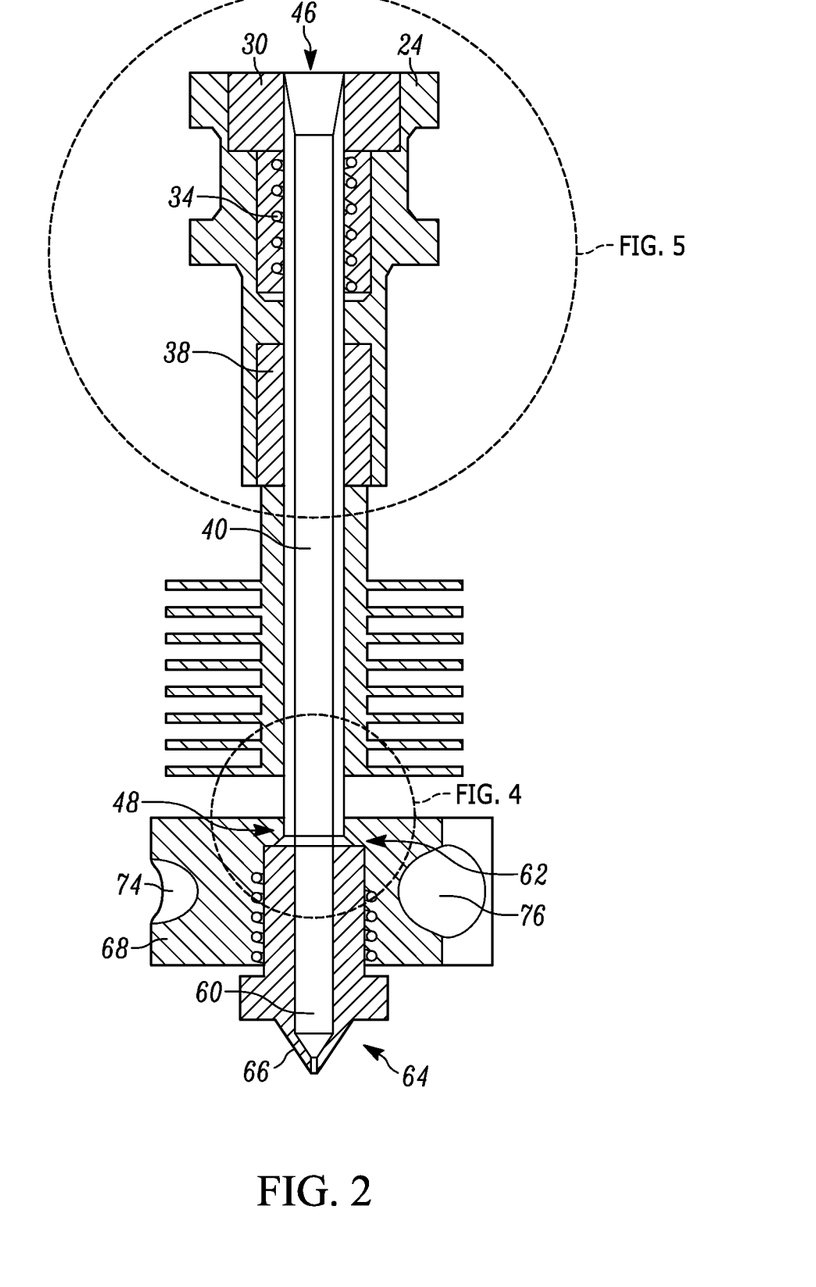
FIG. 2 is a sectional view along "A-A" of FIG. 1.
Figure 3:
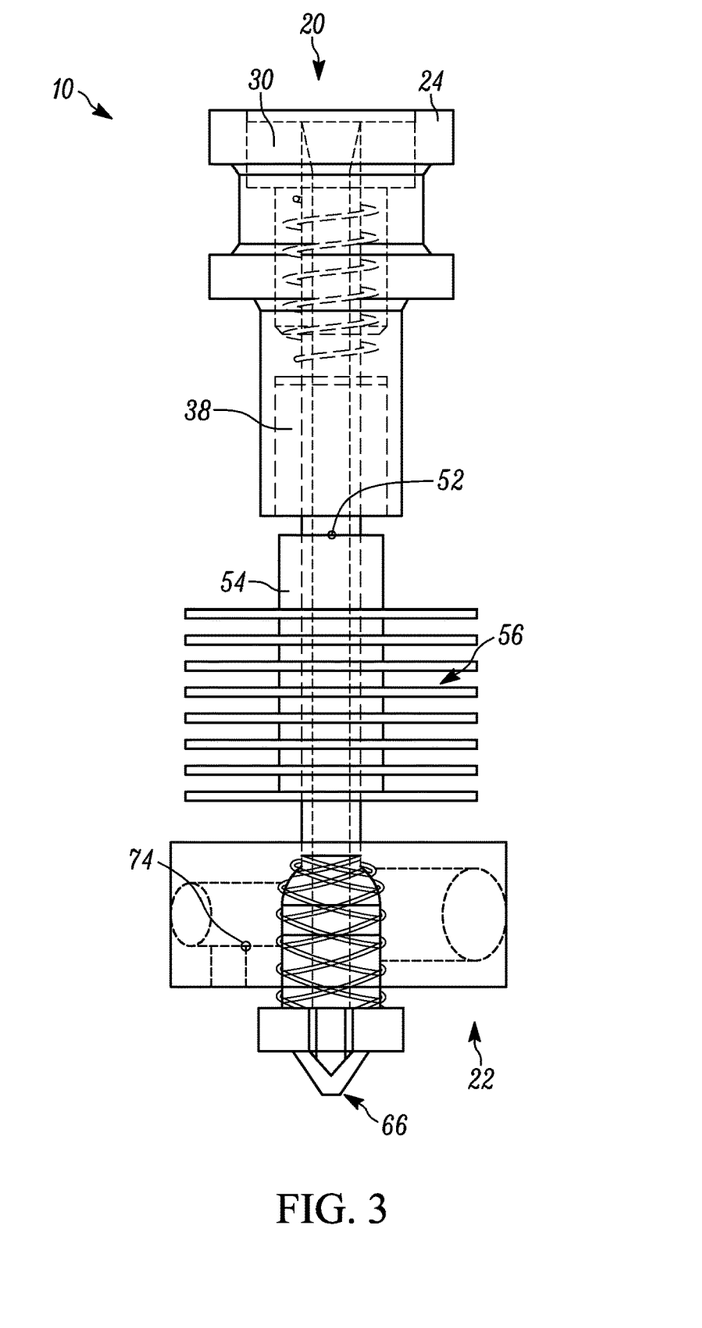
FIG. 3 is a side view of the extruder barrel assembly of FIG. 1 in an active state showing some components of the assembly in phantom.

FIGS. 1-5 show an auto-retracting extruder barrel 10. The extruder barrel 10 extends along a longitudinal axis 12 between a first end 20 and a second end 22, FIGS. 1 and 2 show the barrel 10 in a stand-by state, and FIG. 3 shows the barrel 10 in an active state.

Figure 5:
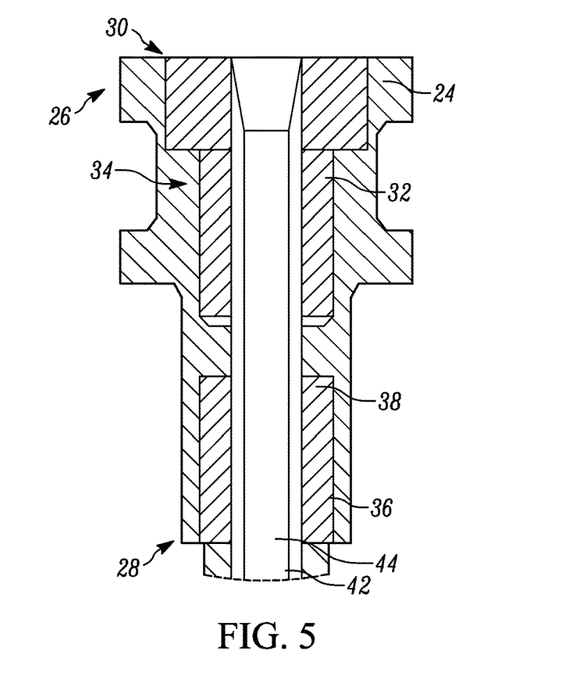
FIG. 5 is a detailed view of area "C" of FIG. 2.

With attention directed toward FIGS. 2, 3, and 5, an upper mounting sleeve 24 is provided at the first end 20 of the barrel 10. The upper mounting sleeve 24 has a first end 26 and a second end 28. A cylindrical spring cavity 32 is provided at the first end 26. The spring cavity 32 extends into the upper mounting sleeve 24 along the longitudinal axis 12. A collar 30 is provided in the spring cavity 32. The collar 30 closes off the spring cavity 32 at the first end 26 of the upper mounting sleeve 24. The collar 30 is movable relative to the upper mounting sleeve 24 along the longitudinal axis 12 in the spring cavity 32. A compression spring 34 is provided in the spring cavity 32.

A cylindrical bearing cavity 36 is provided at the second end 28 of the upper mounting sleeve 24. The bearing cavity 36 extends into the upper mounting, sleeve 24 along the longitudinal axis 12. The bearing cavity 36 receives a linear hearing 38. In one example embodiment an interference fit is used to retain the linear bearing 38 within the bearing cavity 36. However, any other appropriate retention method may be used. For example, the bearing 38 may be welded to the bearing cavity 36. Alternatively, an external surface of the bearing 38 may be provided with external threads that interact with corresponding threads provided in the bearing cavity 36.

With attention now directed to FIGS. 2-5, the extruder barrel 10 farther comprises an inner sleeve 40. The inner sleeve 40 has a first end 46 and a second end 48. The first end 46 is attached to the collar 30. In one example embodiment a set screw is used to attach the first end 46 of the inner sleeve 40 to the collar 30. However, any other appropriate method may be used. For example, the inner sleeve 40 and the collar 30 may be welded together.

The inner sleeve 40 extends through the upper mounting sleeve 24 along the longitudinal axis 12 such that the compression spring 34 and the linear bearing 38 surround the inner sleeve 40. The linear bearing 38 allows the inner sleeve 40 to smoothly slide along the longitudinal axis 12 relative to the upper mounting sleeve 24.

Although the illustrated example embodiment shows the single compression spring 34 surrounding the inner sleeve 40, it is contemplated that other spring configurations may be used. For example, the spring cavity 24 may include a plurality of springs having longitudinal axes that are radially outwardly offset from the longitudinal axis 12 of the barrel 10.

Figure 4:
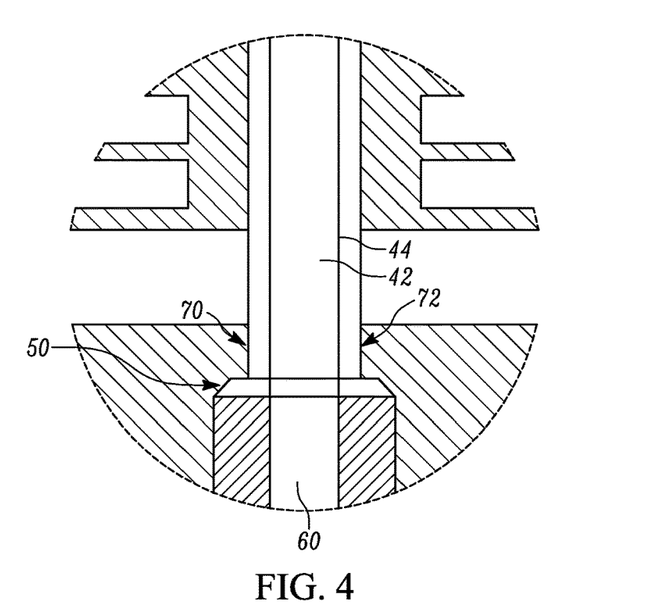
FIG. 4 is a detail view of area "B" of FIG. 2.

As clearly shown in FIGS. 4 and 5, the inner sleeve 40 includes a first part 42 and a second part 44. The second part 44 surrounds, and is concentric with, the first part 42. In one example embodiment the first and second parts 42, 44 are manufactured out of stainless steel. However, any other appropriate materials having low thermal conductivity and appropriate strength may be used. The second part 44 is provided with a flared compression fitting 50 at the second end 48 of the inner sleeve 40.

The extruder barrel 10 further comprises a liquefier assembly 58 provided at the second end 22 of the barrel 10. The liquefier assembly 58 includes a nozzle 60 having a first end 62 and a second end 64. The second end 64 is provided with a nozzle tip 66. A liquefier block 68 surrounds the nozzle 60 such that the nozzle 60 is substantially covered by the liquefier block 68. The nozzle tip 66 protrudes from one end of the block 68 along the longitudinal axis 12 of the extruder barrel 10, The liquefier block 68 houses a thermocouple 74 and a heater 76.

As clearly shown in FIG. 4, the liquefier block 68 is provided with a connecting portion 70. The flared compression fitting 50 of the inner sleeve 40 is received in the connecting portion 70, thereby securing the liquefier assembly 58 to the second end 48 of the inner sleeve 40. The connecting portion 70 is dimensioned such that a void 72 is created between the liquefier block 68 and the second part 44 of the inner sleeve 40. The first part 42 of the inner sleeve 40 is in fluid communication with the nozzle 60 when the inner sleeve 40 and the liquefier assembly 58 are connected to one another.

A lower outer cooling sleeve 52 is provided on the inner sleeve 40. The cooling sleeve 52 is located along the longitudinal axis 12 between the upper mounting sleeve 24 and the liquefier assembly 58. The cooling sleeve 52 includes a main portion 54 and a plurality of cooling fins 56. The inner sleeve 40 extends through the cooling sleeve 52 such that the main portion 54 surrounds, and is concentric with, the inner sleeve 40. In one example embodiment the cooling sleeve 52 is retained on the inner sleeve 40 by an interference fit. However, any other appropriate retention method may be used. For example, the main portion 54 of the cooling sleeve 52 may be welded to the second part 44 of the inner sleeve 40.

The cooling fins 56 extend radially outward away from the longitudinal axis 120 In one example embodiment the main portion 54 and the cooling fins 56 are manufactured as a single integral unit. However, it is contemplated that the main portion 54 and the cooling fins 56 may be manufactured separately and subsequently attached to one another. In the illustrated example embodiment the cooling sleeve 52 is provided with nine cooling fins 56. However, the cooling sleeve 52 may be provided with fewer or greater cooling fins 56 in order to tailor the performance characteristics of the cooling sleeve 52 for a particular application.

The extruder barrel 10 is moveable between the stand-by state and the active state. The design of the extruder barrel 10 is such that the extruder barrel 10 is biased to the stand-by state as a default state (i.e. without any external forces acting on the extruder barrel 10).

In the stand-by state the compression spring 34 acts between the collar 30 and the spring cavity 32 to bias the collar 30 along the longitudinal axis 12 toward the first end 20 of the extruder 10. The inner sleeve 40, cooling sleeve 52, and the liquefier assembly 58 are also biased toward the first end 20 of the extruder it) due to the interconnection between the collar 30, the inner sleeve 40, the cooling sleeve 52, and the liquefier assembly 58.

Compressing the compression spring 34 results in the extruder moving to the active state, Compression of the compression spring 34 allows the collar 30 to move along the longitudinal axis 12 toward the second end 22 of the extruder 10. Again, the inner sleeve 40, the cooling sleeve 52, and the liquefier assembly 58 move with the collar 30 toward the second end 22 of the extruder 10.

Figure 6:
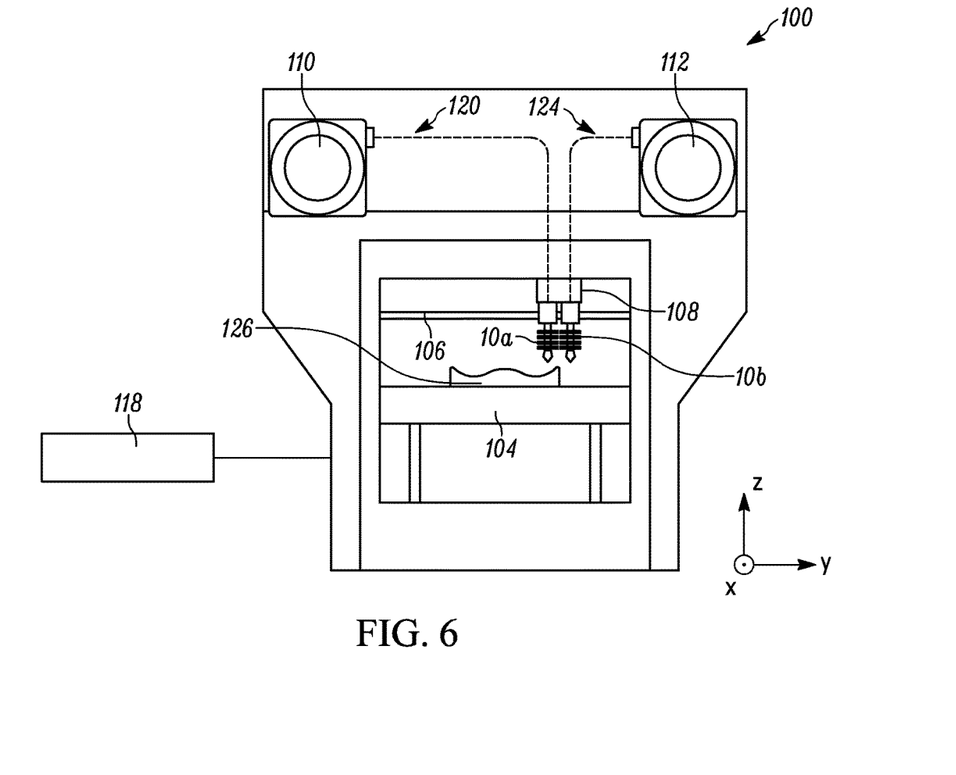
FIG. 6 is a side view of a highly schematized additive manufacturing system that may employ the extruder barrel assembly shown in FIG. 1.

Now referring to FIG. 6, an additive manufacturing system 100 is shown manufacturing a three dimensional model 126. A control system 118 is provided to direct the additive manufacturing system 100. The control system 118 is programmed with instructions for manufacturing the three dimensional model 126. The additive manufacturing system 100 includes a first extruder 10a and a second extruder 10b. The first and second extruders 10a, 10b, are of the type described above and shown in FIGS. 1-5. it should be understood that references made to components of the first extruder will he indicated with an "a" suffix, and references made to components of the second extruder 10b will be indicated with a "b" suffix.

The nozzle tips 66a, 66b of the first and second extruders 10a, 10b may be the same or different from one another. For example, the first extruder 66a may he provided with a small diameter nozzle tip 66a that permits the manufacture of fine details at a slow rate, and the second extruder 66b may be provided with a large diameter nozzle 66b that permits the manufacture of coarse details at a fast rate.

The first and second extruders 10a, 10b are fixedly mounted to an extruder head 108. The extruder head 108 is supported by a gantry 106. The gantry 106 moves the extruder head 108 and, thus, the first and second extruders 10a, 10b in the "X" and "Y" directions. The three dimensional model 126 is built on a platform 104. The platform 104 can move in the "Z" direction. A first material 120 is dispensed by a first material source 110. A second material 124 is dispensed by a second material source 112. The first and second materials 120, 124 may be the same or different from one another. The first and second materials 120, 124 are respectively fed into the first and second extruders 10a, 10b.

In use, the control system 118 can select between commanding the first material source 110 or the second material source 112 to dispense material. For the purposes of discussion, the operation of the additive manufacturing system 100 will be explained beginning with the control system 118 commanding the first material source 110 to dispense the first material 120.

The first material source 110 feeds the first material 120 through the extruder head 108 and into the inner sleeve 40a at the first end 20a of the first extruder 10a. The material 120 is pushed through the inner sleeve 40a, out of the second end 48a of the inner sleeve 40a, and into the liquefier assembly 58a, The first material 120 enters into the liquefier assembly 58a via the first end 62a of the nozzle 60a, The liquefier block 68a is heated by the heater 76a, The control system 118 monitors the heater 76a via the thermocouple 74a to ensure the liquefier block 68a is heated to an appropriate temperature, Heat transfer between the liquefier block 68a and the nozzle 60a occurs such that the nozzle 60a is heated to substantially the same temperature as the liquefier block 68a, The heated nozzle 60a heats the first material 120 as the first material 120 travels from the first end 62a to the second end 64a of the nozzle 60a, Heating the first material 120 causes the first material 120 to melt, and the first material 120 is substantially liquefied upon exiting the first extruder 10a via the nozzle tip 66a.

It should be noted that the void 72a provided between the liquefier block 68a and the second part 44a of the inner sleeve 40a minimizes heat transfer between the liquefier block 68a and the inner sleeve 40a. Additionally, the cooling fins 56a of the cooling sleeve 54a act as a heat sink and dissipate any heat that may inadvertently be transferred to the inner sleeve 40a. Minimizing heat transfer to the inner sleeve 40a is critical to ensuring that the first material 120 does not prematurely melt in the inner sleeve 40a before the first material 120 enters the nozzle 60a, Blockages may occur in the inner sleeve 40a if the first material 120 is heated before entering the nozzle 60a. Blockages in the inner sleeve 40a may result in undesirable operating performance of the additive manufacturing system 100.

The diameter of the nozzle tip 66a is substantially smaller than the diameter of the rest of the nozzle 60a and the first part 42a of the inner sleeve 40a, The reduced diameter of the nozzle tip 66a creates an area in the nozzle 60a that restricts the flow of the first material 120. As additional first material 120 is fed into the first extruder 10a, the flow restriction created by the nozzle tip 66a results in a downward force in the "Z" direction that is exerted upon the nozzle 60a, The downward force is transmitted to the collar 30a via the inner sleeve 40a. The collar 30a exerts the downward force on the compression spring 34a, thereby causing the compression spring 34a to compress. As the compression spring 34a is compressed the collar 30a moves downward in the "Z" direction. Movement of the collar 30a also causes the inner sleeve 40a the cooling sleeve 52a, and the liquefier assembly 58a to move downward in the "Z" direction, thereby moving the nozzle tip 66a into the active state.

When it is necessary to switch to the second material 124 the control system 118 first commands the first material source 110 to slightly retract the first material 120 away from the second end 22a of the first extruder 10a. Retracting the first material 120 away from the second end 22a prevents the inadvertent release of the first material 120 from the nozzle tip 66a. Additionally, retracting the first material 120 removes the force exerted upon the nozzle 60a. The compression spring 34a is able to expand once the force exerted upon the nozzle 60a is removed. The expanding compression spring 34a moves the collar 30a upward in the "Z" direction, thereby also moving the inner sleeve 40a, the cooling sleeve 52a, and the liquefier assembly 58a upward in the "Z" direction. Moving the collar 30a, the inner sleeve 40a, the cooling sleeve 52a, and the liquefier assembly 58a upward in the "Z" direction returns the first extruder 10a to the stand-by state.

With the first extruder 10a in the stand-by state the control system 118 commands the second material source 112 to dispense the second material 124. The second material 124 is fed through the extruder head 108 and into the inner sleeve 40b at the first end 20b of the second extruder 10b. The operation of the second extruder 10b is identical to the operation of the first extruder 10a set forth above.

When it is necessary to switch back to the first material 120 the control system 118 commands the second material source 112 to slightly retract the second material 124 away from the second end 22b of the second extruder 10b, thereby returning the second extruder to the stand-by state.

Switching between the first material 120 and the second material 124 is accomplished in the manner set forth above. When the additive manufacturing system 100 completes the manufacture of the three dimensional model 126 the control system commands both the first and second material sources 110, 112 to retract the materials out of the nozzles 60a, 60b and into the inner sleeves 40a, 40b, This moves the first and second extruders to 10a, 10b to the stand-by state, thereby completing the manufacturing process.

Figure 7:
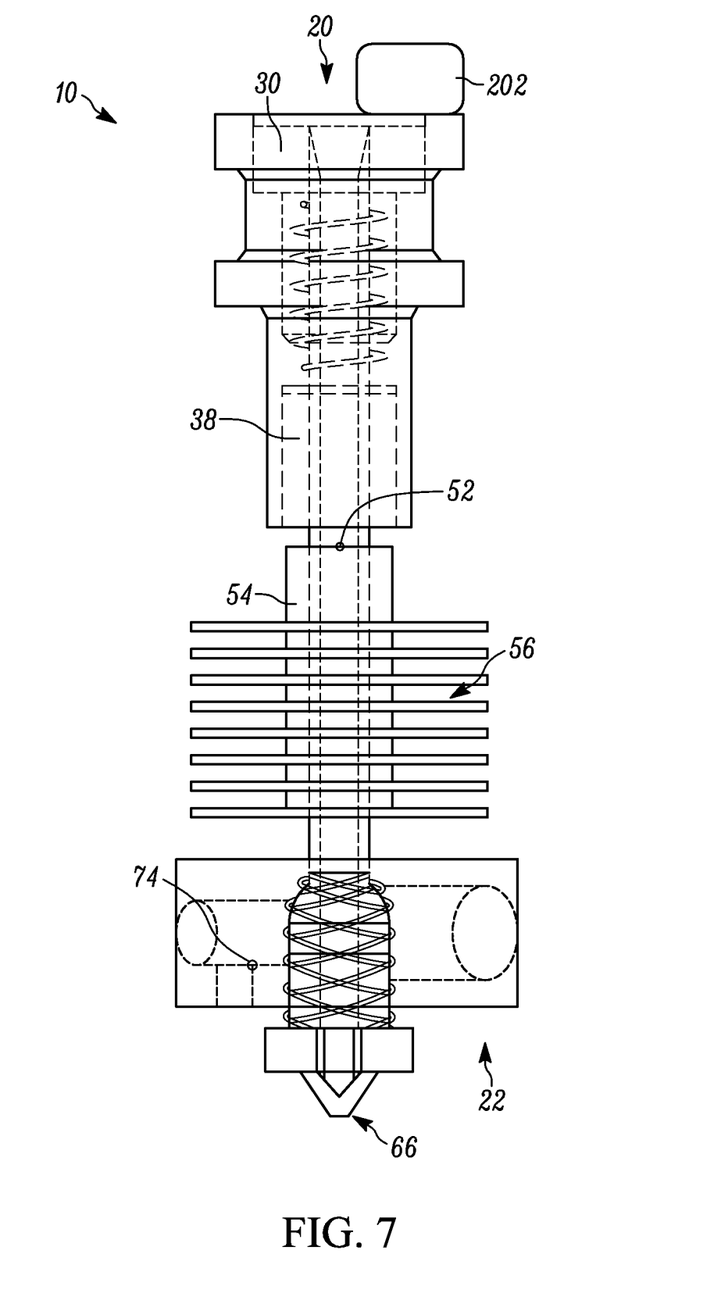
FIG. 7 is a side view of an extruder barrel assembly according to another aspect of the present disclosure in a stand-by state.

In yet another example embodiment, movement of the collar 30, the inner sleeve 40, the cooling sleeve 52, the liquefier assembly 58 and the nozzle 66 between the active state and the state-by state can be effectuated by an actuating system 202 (shown schematically in FIG. 7). The actuating system can be a solenoid actuator, a servo actuator, or any other suitable actuator. The compression spring can optionally be omitted if the barrel 10 is provided with an actuating system 202. Alternatively, the compression spring's spring constant can be sized to act as an assist to actuating system 202.

What have been described above are examples of the present disclosure. It is, of course, not possible to describe every conceivable combination of components or methodologies for purposes of describing the present invention, but one of ordinary skill in the art will recognize that many further combinations and permutations of the present disclosure are possible. Accordingly, the present invention is intended to embrace all such alterations, modifications, and variations that fall within the spirit and scope of the appended claims.

What is claimed is:

1. A barrel for use in an additive manufacturing machine comprising:
   a sleeve extending along a longitudinal axis;
   a conduit extending along the longitudinal axis through the sleeve, the conduit being movable relative to the sleeve along the longitudinal axis between a first position and a second position;
   a nozzle fluidly connected to the conduit, wherein the conduit provides a path for a material to flow through, the nozzle being movable with the conduit relative to the sleeve between the first position and the second position, wherein said first position comprises a closed position and the second position comprises an open position;
   a spring located in the sleeve opposite the nozzle, the spring biasing the conduit toward the first position in a direction toward the spring; and
   a nozzle tip of the nozzle having a first diameter that is less than a second diameter of the nozzle, wherein a first force generated from the material flow from the conduit interacts with the diameter differential between the first and second diameters is greater than a biasing force generated by the spring.

2. The barrel of claim 1 wherein said spring is located in the sleeve between the nozzle and a collar.

3. The barrel of claim 1 further comprising a liquefier block associated with the nozzle.

4. The barrel of claim 3 further comprising a cooling sleeve surrounding the conduit, the cooling sleeve being spaced apart from the liquefier block along the longitudinal axis and including at least one cooling fin.

5. The barrel of claim 3 wherein the liquefier block includes a thermocouple and a heater.

6. The barrel of claim 3 wherein the liquefier block includes a void that extends radially outward about the conduit.

7. The barrel of claim 4 further comprising a bearing disposed between the conduit and the cooling sleeve.

8. A barrel for use in an additive manufacturing machine comprising:
   a sleeve extending along a longitudinal axis;
   a conduit coupled to a collar opposite a nozzle, the conduit extending along the longitudinal axis through the sleeve, the conduit, collar, and nozzle being movable relative to the sleeve along the longitudinal axis between a first position and a second position;
   the nozzle fluidly connected to the conduit to allow a material to flow through the conduit, the nozzle being movable with the conduit and the collar relative to the sleeve between the first position and the second position wherein said first position comprises a closed position and the second position comprises an open position;
   a spring located in the sleeve between the collar and the nozzle, the spring biasing the conduit and the collar toward the first position; and
   a liquefier block coupled to and movable with the nozzle.

9. The barrel of claim 8 wherein said first position biases the collar in a direction away from the nozzle and maintains the nozzle in lifted position and the second position biases the collar in a direction toward the nozzle, compresses the spring, and moves the nozzle into a dispensing position.

10. The actuator of claim 8 further comprising a nozzle tip having a first diameter that is at least 1.15 times less than a second diameter of the nozzle, wherein a first force generated from a material flow interacting with the diameter differential between the first and second diameters is greater than a biasing force generated by the spring.

11. The barrel of claim 10 further comprising a cooling sleeve surrounding the conduit, the cooling sleeve being spaced apart from the liquefier block along the longitudinal axis and including at least one cooling fin.

12. The barrel of claim 10 wherein the liquefier block includes a thermocouple and a heater.

13. The barrel of claim 10 wherein the liquefier block includes a void that extends radially outward about the conduit.

14. The barrel of claim 11 further comprising a bearing disposed between the conduit and the cooling sleeve.

15. The barrel of claim 10 wherein the collar is movably coupled to both the cooling sleeve and the liquefier assembly, such that responsive to the collar moving the cooling sleeve and liquefier assembly also move.

16. A barrel for use in an additive manufacturing machine comprising:
   a sleeve extending along a longitudinal axis;
   a conduit coupled to a collar opposite a nozzle, the conduit extending along the longitudinal axis through the sleeve, the conduit, collar, and nozzle being movable relative to the sleeve along the longitudinal axis between a first position and a second position;
   a spring located in the sleeve, the spring biasing the conduit, collar, and nozzle toward the first position;
   the nozzle is fluidly connected to the conduit, the conduit providing a path for a material to flow through, the nozzle being movable with the conduit and collar relative to the sleeve between the first position and the second position, said first position biases the collar in a direction away from the nozzle and maintains the nozzle in lifted position and the second position biases the collar in a direction toward the nozzle, compresses the spring, and moves the nozzle into a dispensing position;
   a nozzle tip having a first diameter that is at least 1.15 times less than a second diameter of the nozzle, wherein a first force generated from a material flow of the material interacting with the diameter differential between the first and second diameters is greater than a biasing force generated by the spring; and
   a liquefier block coupled to and movable with the nozzle.

17. The barrel of claim 16 wherein a liquefier block is associated with the nozzle.

18. The barrel of claim 17 further comprising a cooling sleeve surrounding the conduit, the cooling sleeve being spaced apart from the liquefier block along the longitudinal axis and including at least one cooling fin.

19. The barrel of claim 17 wherein the liquefier block includes a thermocouple and a heater.

20. The barrel of claim 17 wherein the liquefier block includes a void that extends radially outward about the conduit.

* * * * *